United States Patent
Schäfer et al.

(10) Patent No.: US 11,400,744 B2
(45) Date of Patent: Aug. 2, 2022

(54) INKJET PRINTABLE FILM FOR PACKAGING APPLICATIONS

(71) Applicant: Sihl GmbH, Dueren (DE)

(72) Inventors: Manfred Schäfer, Cologne (DE); Axel Niemöller, Dueren (DE); Ronny Kunze, Schenkelberg (DE); Steffen Ohr, Sursee (CH)

(73) Assignee: Sihl GmbH, Düren (DE)

( * ) Notice: Subject to any disclaimer, the term of this patent is extended or adjusted under 35 U.S.C. 154(b) by 78 days.

(21) Appl. No.: 16/582,107

(22) Filed: Sep. 25, 2019

(65) Prior Publication Data

US 2020/0094535 A1   Mar. 26, 2020

(30) Foreign Application Priority Data

Sep. 25, 2018   (EP) ..................... 18196703

(51) Int. Cl.
*B41M 5/52* (2006.01)
*B41M 5/50* (2006.01)

(52) U.S. Cl.
CPC ............. *B41M 5/52* (2013.01); *B41M 5/508* (2013.01); *B41M 5/5218* (2013.01); *B41M 5/5254* (2013.01)

(58) Field of Classification Search
CPC ...... B41M 5/52; B41M 5/508; B41M 5/5218; B41M 5/5254
USPC .................................................... 428/32.34
See application file for complete search history.

(56) References Cited

U.S. PATENT DOCUMENTS

| | | | |
|---|---|---|---|
| 5,523,149 A | 6/1996 | Kijimuta et al. | |
| 7,585,553 B2 | 9/2009 | Burch et al. | |
| 7,641,947 B2 * | 1/2010 | Chen ..................... | B41M 5/504 428/32.22 |
| 7,662,452 B2 | 2/2010 | Nagashima et al. | |
| 7,671,145 B2 | 3/2010 | Sawant et al. | |
| 7,906,187 B2 | 3/2011 | Bi et al. | |
| 2005/0003179 A1* | 1/2005 | Ito ........................... | B41M 5/52 428/317.9 |
| 2006/0147659 A1 | 7/2006 | Foley | |
| 2007/0092667 A1* | 4/2007 | Beer .................... | B41M 5/5218 428/32.34 |
| 2008/0033142 A1 | 2/2008 | Ogata et al. | |
| 2019/0152209 A1 | 5/2019 | Ikeda et al. | |

FOREIGN PATENT DOCUMENTS

| | | |
|---|---|---|
| DE | 102009014635 A1 | 9/2010 |
| EP | 0634286 A1 | 1/1995 |
| EP | 1504919 A2 | 2/2005 |
| EP | 1644348 B1 | 6/2007 |
| EP | 1884371 A1 | 2/2008 |
| EP | 1861258 B1 | 12/2014 |
| JP | H11309800 A | 11/1999 |
| JP | 200118519 A | 1/2001 |
| JP | 2011207137 A | 10/2011 |
| WO | 2018021572 A1 | 2/2018 |

* cited by examiner

*Primary Examiner* — Betelhem Shewareged
(74) *Attorney, Agent, or Firm* — The Webb Law Firm

(57) ABSTRACT

An inkjet printable flexible film for packaging applications is provided which includes (a) a biaxially oriented polymer film having a thickness in the range of from 8 to 70 μm; and (b) at least one ink-receiving layer including boehmite particles and poly(vinyl alcohol) having a degree of hydrolysis of from 78 to 96 mol % in a weight ratio ranging from 6.5:1 to 20:1 coated over one surface of the biaxially oriented polymer film at a dry coating weight being in the range of from 5 to less than 25 g/m², wherein the ink-receiving layer (b) is formed by (i) applying an aqueous coating composition including boehmite particles, an acidic dispersing agent, poly(vinyl alcohol), and boric acid and/or a borate, or (ii) applying boric acid and/or a borate in a first step and then an aqueous coating composition including boehmite particles, an acidic dispersing agent, poly(vinyl alcohol), and optionally further boric acid and/or borate. The packaging applications include the packaging of food, pet food, beverages, pharmaceuticals and/or personal care products.

26 Claims, No Drawings

INKJET PRINTABLE FILM FOR PACKAGING APPLICATIONS

CROSS-REFERENCE TO RELATED APPLICATION

This application claims priority to European Patent Application No. 18 196 703.5 filed Sep. 25, 2018, the disclosure of which is hereby incorporated by reference in its entirety.

FIELD OF THE INVENTION

The present invention is directed to an inkjet printable flexible film for packaging applications. In particular the present invention relates to a flexible film comprising a polymer film and an ink-receiving layer. The ink-receiving layer can be printed by means of industrial digital inkjet printing.

BACKGROUND OF THE INVENTION

Inkjet printing is widely used for various applications on substrates provided both in standard sheets and on roll. Nowadays, papers and films with microporous ink-receiving layers are common and described in the prior art.

EP 0 634 286 B1 concerns an alumina sol coating fluid containing an alumina hydrate, such as boehmite, a polyvinyl alcohol and boric acid or a borate for forming an ink-receiving layer of a recording sheet to be primarily used as a transparency for overhead projection. In the inventive example the coating fluid is applied to a transparent polyethylene terephthalate film having a thickness of 125 μm.

EP 1 644 348 A1 relates to a process for preparing a dispersion of surface-modified silica by modifying the surface of the silica with the reaction products of an Al(III) compound and an aminosilane. Also described is a recording material comprising an ink-receiving layer containing said dispersion and a binder.

U.S. Pat. No. 7,585,553 B2 is directed to a recording sheet for inkjet photo printing comprising a support layer, such as a transparent film, a basecoat layer comprising an alumina-based composition containing a binder and a topcoat layer comprising a colloidal cationic silica composition. Preferably, the basecoat comprises pseudo-boehmite. It is taught that in the printed sheet a high amount of color is maintained in the topcoat since the cationic silica serves to hold the anionic dye of the printing ink, whereas the lower alumina-containing basecoat serves to attract the solvent of the printing ink. In the examples the basecoat is applied with coating weights of more than 40 g/m$^2$.

U.S. Pat. No. 7,906,187 B2 describes an inkjet printing medium for near-photographic prints comprising a polyethylene-based substrate, a first ink-receiving layer containing a cationic silica and a binder, and a second gloss-enhancing layer containing a second cationic silica.

EP 1 861 258 B1 is directed to a process for preparing an inkjet printable microporous medium for indoor and outdoor graphic displays, selected from paper or film, comprising a substrate, an intermediate layer comprising a specific mixture of acrylic (co)polymers, and an ink-receptive topcoat. The porous ink-receptive topcoat comprises inorganic particles and a polymeric binder. In the examples PET films having a thickness of 96 μm are coated with an intermediate layer and an ink-receptive top layer comprising boehmite and a poly(vinyl alcohol) binder.

DE 10 2009 014 635 A1 relates to an opaque multilayer recording material for photo prints and advertising prints comprising two polyolefin layers, two paper layers arranged between the two polyolefin layers, an opaque layer between the two paper layers, and at least one inkjet printable outer ink-receiving layer. In the examples the outer ink-receiving layers comprising boehmite and a polyvinyl alcohol binder in a weight ratio of about 4.3:1 are coated on various multilayer substrates.

WO 2018/021572 A1 concerns an inkjet recording medium comprising a transparent support and a transparent porous layer containing inorganic particles, preferably selected from silica, alumina, and pseudo-boehmite.

JP 11309800 A is about a packaging material that can be printed by electrophotographic, thermal transfer, inkjet, offset or flexographic printing and comprises a plastic film and an ink receiving layer containing at least one of inorganic particles, organic particles, dyes, and pigments. Exemplary inorganic particles are silica, clay, talc, diatomaceous earth, calcium carbonate, barium sulfate, aluminum silicate, synthetic zeolite, alumina, zinc oxide, and mica.

EP 1 884 371 A1 is directed to a package for an inkjet recording material wherein an inkjet recording material in which an ink-receiving layer including fine inorganic particles, e.g. fumed silica, colloidal silica, alumina, and alumina hydrate; and a thioetheric compound is disposed on a support is packaged by a material comprising a polylactic acid resin.

SUMMARY OF THE INVENTION

Although various inkjet recording media are described in the art, there is still a need for a highly flexible packaging material that can be printed with aqueous inks in high speed ink jet printing and results in high quality water-resistant prints. The recording medium should be able to be readily processed further to the final packaging. Conformity of the recording medium as contact material for food, pharmaceuticals, and personal care products is essential if used accordingly.

This need is met by an inkjet printable flexible film for packaging applications comprising:

(a) a biaxially oriented polymer film having a thickness in the range of from 8 to 70 μm; and (b) at least one ink-receiving layer comprising boehmite particles and poly(vinyl alcohol) having a degree of hydrolysis of from 78 to 96 mol % in a weight ratio ranging from 6.5:1 to 20:1 coated over one surface of the biaxially oriented polymer film at a dry coating weight being in the range of from 5 to less than 25 g/m$^2$, wherein the ink-receiving layer (b) is formed by (i) applying an aqueous coating composition comprising boehmite particles, an acidic dispersing agent, poly(vinyl alcohol), and boric acid and/or a borate, or (ii) applying boric acid and/or a borate in a first step and then an aqueous coating composition comprising boehmite particles, an acidic dispersing agent, poly(vinyl alcohol), and optionally further boric acid and/or borate.

The present invention is also directed to a multilayer laminate comprising the inkjet printable flexible film and to a packaging comprising the printed inkjet printable flexible film or printed multilayer laminate.

The present invention further concerns the use of the printed inkjet printable flexible film, the printed multilayer laminate or the packaging for packaging food, pet food, beverages, pharmaceuticals and/or personal care products.

Moreover, the present invention relates to a method of making a filled packaging wherein the inkjet printable flexible film or the multilayer laminate is inkjet printed in line as part of a form fill seal process.

The thin inventive inkjet printable flexible film comprising the specific ink-receiving layer is highly flexible and has excellent mechanical stability. It exhibits a high crack resistance as required for packaging applications. The ink-receiving layer is optimized for fast inkjet-printing and water-fast and flake-off resistant inkjet prints can be produced. It was surprisingly found that despite the low film thickness and low coating weight, the inventive inkjet printable flexible film withstands strong mechanical impact, i.e. folding, stretching, and bending, and is well suited for automatic processing. Moreover and quite importantly, the chemistry of the ink-receiving layer does not necessitate the presence of any low molecular organic substances which are prone to migration. Thus, such substances, e.g. surfactants, wetting agents, defoamers, and antistatic agents, can be omitted or reduced to a minimum to obtain a food-safe packaging material

DETAILED DESCRIPTION OF THE INVENTION

The present inkjet printable flexible film comprises a biaxially oriented polymer film (a) as a substrate on which the ink-receiving layer (b) is coated.

The biaxially oriented polymer film (a) can be any polymeric material that can be processed to film and biaxially oriented. Typically, the polymer film comprises a thermoplastic material. Useful thermoplastic materials include polyesters, polyolefins, polystyrenes, polyamides, polyacrylates, polycarbonates, derivates of cellulose such as cellulose triacetate, biodegradable polymers such as starch and poly (amino acid)s, and blends and copolymers thereof of these polymers. Suitable biaxially oriented polymer films are commercially available and have high initial tear strength and low propagation tear resistance. The propagation tear resistance (determined according to ISO 6383-1) is typically in the range of from 0.3 to 3.0 N/mm or even lower.

In preferred embodiments the biaxially oriented thermoplastic material is selected from the group consisting of polyesters, polyolefins, polystyrenes, polyamides, including homo- and copolymers, and blends thereof. More preferably the thermoplastic material is selected from the group consisting of polyesters, even more preferably poly(ethylene terephthalate)s, poly(ethylene naphthalate)s, and polylactides (colloquially also referred to "poly(lactic acid)"—PLA); polyolefins, even more preferably polypropylene; polyamides such as PA 6; and blends and copolymers thereof. The most preferred biaxially oriented polymer films are biaxially oriented polypropylene (BOPP) such as BOPP films available Innovia under the tradename Rayoface®, biaxially oriented poly(ethylene terephthalate) (BOPET) such as BOPET films available from Mitsubishi under the tradname Hostaphan® and from DuPont under the tradenames Mylar® and Melinex®, biaxially oriented polylactide (BOPLA), and biaxially oriented polyamide (BOPA), e.g. BOPA6. Exemplary initial tear resistance values (measured according to ASTM D 1004-09) for a 30 μm thick BOPP film in machine and cross direction are about 25 N and 21 N, respectively. Exemplary initial tear resistance values for a 12 μm thick BOPET film in machine and cross direction are about 12 N and 25 N, respectively. The preferred biaxially oriented polymer films also have a high tensile strength and high thermal stability, particularly a melting point of above 135° C. as can be determined by DSC measurements. Exemplary tensile strength values (measured according to ISO 1924) for a 30 μm thick BOPP film in machine and cross direction are about 122 N/15 mm and 67 N/15 mm, respectively. Exemplary tensile strength values for a 12 μm thick BOPET film in machine and cross direction are about 110 N/15 mm and 173 N/15 mm, respectively.

The biaxially oriented polymer film (a) can also be as coextruded polymer film. Coextruded biaxially oriented polymer films wherein the first layer is a polymer as described above and the second layer is a polymer having better adhesion towards the ink-receiving layer (b). e.g. a propylene/ethylene copolymer, are preferred.

The biaxially oriented polymer film (a) can be transparent, translucent or opaque, e.g. white opaque. Suitable films can be foamed, cavitated, or dyed in the mass, e.g. with a white pigment. The surface(s) of biaxially oriented polymer film can be treated, e.g. by corona treatment, flame treatment, or chemical treatment. The treatment of the surface can have various effects such as an improvement of wettability and adhesion to the adjacent ink-receiving layer, especially in the case of BOPP films, and thus in an increase of composite strength. The thickness of the biaxially oriented polymer film is in the range of from 8 to 70 μm, preferably from 12 to 60 μm.

The ink-receiving layer (b) applied on at least one surface of the biaxially oriented polymer film comprises boehmite particles.

Boehmite is a mineral of aluminum with an orthorhombic unit cell (a=3.693° A, b=12.221° A, and c=2.865° A), classified as aluminum oxide hydroxide (γ-AlO(OH) (=$Al_2O_3.H_2O$)). Its crystal structure consists of double layers of oxygen octahedrons with a central aluminum atom. The outfacing oxygen is bonded via hydrogen bonds to the hydroxyl group of the adjacent layer of octahedrons. Due to the weak bonds, boehmite is prone to intercalation, that is, the inclusion of small molecules, usually water, in between these layers. This causes a larger spacing in [010] direction and a perfect cleavage perpendicular to the general direction of the hydrogen bonding. Boehmite with an increased spacing in the [010] direction is referred to as pseudoboehmite and amorphous boehmite is usually referred to as gel. Pseudoboehmite is characterized by a higher water content ($Al_2O_3$*x $H_2O$ (1.0<x<2.0). Boehmite can be found in nature or precipitated and grown from solution of aluminum salts and alumina under hydrothermal conditions. Boehmite particles within the meaning of the present invention are small primary aggregates of boehmite crystallites.

Favorably, the boehmite crystallites are not needle-shaped, preferably they are tabular and more preferably have an average aspect ratio of 3.0 or more and 10 or less and a tabular surface with a major axis-to-horizontal ratio of 0.60 or more and 1.0 or less. The aspect ratio can be determined by a method disclosed in Japanese Patent Publication No. 5-16015. The aspect ratio is herein expressed as the ratio of the diameter to the thickness of a particle. The term "diameter" as used herein refers to the diameter of a circle having the same area as the projected area of a particle of the alumina hydrate as observed with a microscope or an electron microscope (equivalent circle diameter). The major axis-to-minor axis ratio of the tabular surface is defined as the ratio of the minimum diameter to maximum diameter of the tabular surface as observed with a microscope in the same manner as described for the aspect ratio.

The size ($d_{50}$, volume mean) of the boehmite crystallites in the dry powder can, for example, be in the range of from 7 to 80 nm, preferably from 8 to 50 nm, and more preferably from 10 to 20 nm, as determined by X-ray diffraction on X-ray diffractometers supplied by Siemens of Philips.

The small primary aggregates of boehmite crystallites can be obtained by dispersion of secondary larger agglomerates of boehmite crystallites having a mean particle size in the range of from 1 μm to 100 μm present in commercially available boehmite powders, e.g. as delivered from a spray drying process.

The dispersed boehmite particles (small primary aggregates of boehmite crystallites) typically have a particle size ($d_{50}$, volume mean) in the range of from 30 nm to 300 nm, preferably from 50 nm to 200 nm, more preferably from 80 to 180 nm, as determined by photon correlation spectroscopy on Malvern, Horiba or Cilias instruments after dispersion of the boehmite powder in acidic solution (10 weight % of $Al_2O_3$ in 0.4 weight % of $HNO_3$). The particles size distribution is preferably unimodal.

The primary aggregates have a porous structure. Typically, the boehmite particles have an average pore volume of from 0.5 to 1.5 ml/g, preferably from 0.8 to 1.3 ml/g. Typically, the boehmite particles have a BET surface area of from 100 to 200 $m^2$/g, preferably from 120 to 180 $m^2$/g. The average pore volume and the BET surface area are determined by gas adsorption according to DIN 66135-1 on the powder after calcination at 550° C. for 3 h.

Suitable commercially available boehmite powders to be used in the ink-receiving layer (b) include DISPERAL® and DISPAL® grades available from Sasol, e.g. HP8, HP10, HP 14, and HP 18, preferably HP 14.

The poly(vinyl alcohol) functions as the polymeric binder of the ink-receiving layer (b). Preferably, poly(vinyl alcohol) is the sole binder polymer in the ink-receiving layer (b), i.e. no other polymer is present in the ink-receiving layer (b) apart from any optional polymeric particles as described below.

"Poly(vinyl alcohol)" is herein defined as generally acknowledged in the art as a completely or partially hydrolyzed poly(vinyl acetate). The degree of hydrolysis attributed to a poly(vinyl alcohol) designates the degree of hydrolysis of the poly(vinyl acetate) in accordance with standard practice. The degree of hydrolysis is from 78 to 96 mol %, preferably from 80 to 95 mol %, more preferably from 82 to 94 mol %, even more preferably from 84 to 93 mol %, and most preferably from 86 to 92.5 mol %. It has been observed that the use of poly(vinyl alcohol) having a degree of hydrolysis above 96 mol % results in an undesired gelling of the aqueous coating composition making it impracticable for the coating process.

The degree of hydrolysis (saponification) H indicates what percentage of the basic poly(vinyl acetate) molecules is "saponified" to poly(vinyl alcohol). From the residual acetyl group content and thus the ester value EV, H is calculated by using the following formula:

$$H \text{ in mol \%} = \frac{100 - 0.1535 \cdot EV}{100 - 0.0749 \cdot EV} \cdot 100$$

A degree of hydrolysis of 100% means, therefore, that the poly(vinyl alcohol) has no acetyl groups. The term "ester value" (EV) connotes the number of mg KOH needed to neutralize the acid released from the ester by saponification in 1 g of substance. It is determined in analogy to DIN 53401 as follows: Approximately 1 g of poly(vinyl alcohol) is weighed into a 250-ml round-bottomed flask and mixed with 70 ml distilled water and 30 ml neutralized alcohol, then heated with reflux until it dissolves. After cooling it is neutralized against phenol phthalein with 0.1 n KOH. When neutralization is complete, 50 ml 0.1 n KOH are added and the mixture is boiled for 1 hour with reflux. The excess caustic solution is back-titrated in the heat with 0.1 n HCl against phenol phthalein as indicator until the coloration fails to recur. A blank test is carried out at the same time.

$$\text{Ester value } (EV) = \frac{(a-b) \cdot 5.61}{E}$$

a=consumption of ml 0.1 n KOH
b=consumption of ml 0.1 n KOH in the blank test
E=weighed quantity of poly(vinyl alcohol) (dry)

The degree of hydrolysis of the poly(vinyl alcohol) has to be understood as an average value, meaning that mixtures of less hydrolyzed and more hydrolyzed poly(vinyl alcohol)s can be used as well.

It has been observed that poly(vinyl alcohol) having an average degree of hydrolysis above 96 mol % results in an undesired gelling of the aqueous coating composition making it impracticable for the coating process. On the other hand, a degree of hydrolysis of less than 78 mol % does no longer provide the required water-solubility of the poly (vinyl alcohol).

Typically, the weight average molecular weight of the poly(vinyl alcohol) is at least 100.000 g/mol, more preferably at least 120.000 g/mol, and most preferably at least 150.000 g/mol, as determined by gel permeation chromatography using polystyrene standards combined with static light scattering (absolute method) on re-acetylized specimen. Re-acetylization is performed by standard methods known in the art, e.g. in a pyridine/acetic anhydride mixture. There is no typical maximum value of the weight average molecular weight; sometimes it is below 300.000 g/mol.

Accordingly, the preferred viscosity of a freshly produced 4 weight % aqueous solution of the poly(vinyl alcohol) at 20° C. determined by a Floppier falling ball viscometer following DIN 53015 is from 15 to 150 mPa·s, more preferably from 25 to 80 mPa·s.

The boehmite particles and the poly(vinyl alcohol) are present in the ink-receiving layer in a weight ratio of from 6.5:1 to 20:1, preferably from 7:1 to 15:1, more preferably from 7.5:1 to 14:1, and 8:1 to 12:1. A lower weight ratio results in an ink-receiving layer having a too low porosity and thus low ink absorptivity, and a higher weight ratio results in an instable ink-receiving layer which exhibits a low flex-crack resistance, insufficient adhesion to the biaxially oriented polymer film and can cause cutter dust when cut.

The total amount of boehmite particles and poly(vinyl alcohol) in the ink-receiving layer ranges from 79 to 99.9 weight %, preferably from 90 to 99.5 weight %, based on the total dry coating weight of the ink-receiving layer.

The ink-receiving layer (b) of the present invention may comprise further particles in addition to the boehmite particles, e.g. in order to adapt the coefficient of friction (CoF) and the gloss of the surface of the inkjet printable flexible film. Suitable particles preferably have a particle size ($d_{50}$, volume mean) of 1 to 25 μm, as determined by laser diffraction according to ISO 13320, and include silicas such as precipitated silicas, fumed silicas, gel type silicas, colloidal silicas, preferably gel type silicas, and polymeric particles such as dispersible particles comprising a polymer selected from polymers and copolymers of ethylene, propylene, styrene, tetrafluoroethylene, and (meth)acrylates, e.g. polymethylmethacrylate and styrene/methylmethacrylate copolymer; polyamides; polyesters; and starch, such as rice or corn starch, and mixtures of the afore-mentioned particles. In preferred embodiments the further particles, including the above-mentioned silicas and polymeric particles, are spherical.

The optional particles which are different from boehmite are comprised in the ink-receiving layer in a maximum amount of 20 weight %, based on the total dry coating weight of the ink-receiving layer, preferably the ink-receiving layer comprises >0 to 5 weight % of these optional particles. More specifically, the ink-receiving layer can comprise >0 to 12 weight % of silica as described above and/or >0 to 10 weight % of polymeric particles as described above, such as >0 to 5 weight % of silica and/or >0 to 5 weight % of polymeric particles.

The ink-receiving layer is typically formed from an aqueous coating composition comprising boehmite particles and poy(vinyl alcohol), an acidic dispersing agent and boric acid and/or a borate (method (i)).

Typically, the acidic dispersing agent has a $pk_a$ value of less than 5.0, preferably less than 4.9, more preferably less than 4.0, even more preferably less than 3.0, and most preferably less than 2.0. Suitable acidic dispersing agents include strong organic acids having a $pk_a$ of less than 5.0, such as formic acid ($pk_a$=3.77), acetic acid ($pk_a$=4.75), lactic acid ($pk_a$=3.90), and propionic acid ($pk_a$=4.87), and inorganic acids having a $pk_a$ of less than 5.0. In preferred embodiments the acidic dispersing agent comprises an inorganic acid having a $pk_a$ of less than 2.0, such as HCl, HBr, $HNO_3$, $H_2SO_4$, and sulfamic acid.

Preferably, the acidic dispersing agent, especially the preferred acidic dispersing agents mentioned above, is present in the aqueous coating composition in a maximum amount of 10 weight %, based on the weight of the boehmite particles. Typical amounts of the acidic dispersing agent range from 1 to 5 weight %, based based on the weight of the boehmite particles.

The boric acid and/or borate present in either the aqueous coating composition itself (method (i) or in an underlying layer (method (ii)) function as a crosslinking agent for the poly(vinyl alcohol) binder although the actual crosslinking mechanism is not fully understood. Following the rules of chemical equilibrium, it depends on the pH value of the aqueous coating composition whether the protonated form or the deprotonated forms (borates) of boric acid is/are the dominant species. The boric acid can be added as boric acid, boron oxid (reacting with water to boric acid) or borate such as sodium tetraborate decahydrate and potassium tetraborate decahydrate. Boric acid and/or borates are typically used in the aqueous coating composition in a total amount of from >0 to 10 weight %, preferably from 1 to 8 weight %, and more preferably from 3 to 7 weight %, each calculated as $H_3BO_3$ and based on the amount of poly(vinyl alcohol). The low amounts of boric acid typically result in less than 60 mg/m$^2$, preferably less than 40 mg/m$^2$, more preferably less than 30 mg/m$^2$, and most preferably less the 20 mg/m$^2$ boron in the dry coating. This ensures an amount of boron in the inkjet printable flexible film of less than 0.02 weight %, based on the weight of the inkjet printable flexible film.

The boric acid crosslinking agent improves the drying properties of the ink-receiving layer, e.g. avoids crack formation in the coating during the drying process. If high amounts of boric acid/borate are used strong crosslinking of the poly(vinyl alcohol) results which might lead to a brittle coating at high coating weights.

Further optional components apart from the acidic dispersing agent and crosslinking agent may be present in the aqueous coating composition and thus, in the ink-receiving layer (b). These optional components include low molecular weight organic compounds such as wetting agents, antifoaming agents, surfactants, biocides, plasticizing agents, stabilizers, silanes, colorants, fixing agents, antistatic agents, dyes, and optical brighteners. Herein, "low molecular weight organic compound" means an organic compound having a molecular weight of less than 1000 g/mol. However, the ink-receiving layer preferably comprises less than 1 weight %, preferably less than 0.5 weight %, more preferably less than 0.1 weight %, based on the total weight of the ink-receiving layer of a surface-active compound. More preferably, the ink-receiving layer comprises less than 1 weight %, preferably less than 0.5 weight %, more preferably less than 0.1 weight %, based on the total weight of the ink-receiving layer, of non-polymeric low molecular weight organic compounds other than the residues of any organic acidic dispersing agent. Even more preferably, the ink-receiving layer comprises less than 1 weight %, preferably less than 0.5 weight %, more preferably less than 0.1 weight %, based on the total weight of the ink-receiving layer, of low molecular weight organic compounds other than the residues of any organic acidic dispersing agent and low molecular poly(vinyl alcohol). In most preferred embodiments the ink-receiving layer is free of such compounds.

In preferred embodiments the ink-receiving layer (b) is free of poly(dimethyldiallylammonium chloride) (poly-DADMAC) and cationic poly(meth)acrylates, more preferably the ink-receiving layer is free of any cationic water-soluble polymers such as used for fixing inks.

Typically, the ink-receiving layer (b) is free of any fluorinated acrylic polymer.

In order to prepare the aqueous coating composition for forming the ink-receiving layer (b) the components are typically mixed by conventional lacquer manufacturing means. Preferably, the boehmite particles and any optional further particles are dispersed in cold or hot water by means of strong agitation or high shear mixing devices, e.g. with rotor-stator principle, in the presence of the dispersing agent. This leads to a dispersion with the required particle size for a homogeneous coating. Typically, the poly(vinyl alcohol) is separately dissolved in water and heated for full dissolution to temperatures of from 70° C. to 100° C. The particle dispersion and poly(vinyl alcohol) solution are mixed together in order to obtain an aqueous coating composition. Boric acid/boron oxide/borates and any other optional ingredients can be added at any stage of the preparation process. Boric acid/boron oxide/borates are added preferably shortly before applying the aqueous coating composition to the substrate (method (i)). Alternatively or additionally, boric acid/boron oxide/borates can also be applied to the substrate before application of the aqueous coating composition (method (ii)). Application to the substrate preferably comprises the addition of the boric acid/boron oxide/borates to an intermediate layer (c) specified below (e.g. as described in EP 1 861 258 B1).

Typically, the aqueous coating composition has a solid content of from 10 to 40 weight %, preferably from 20 to 35 weight %. A typical pH value is within the range of from 2 to 6, preferably from 3 to 5.

The aqueous coating composition can be coated onto the substrate, i.e. the biaxially oriented polymer film or any optional intermediate layers, by any conventional coating method known in the art. For example, the aqueous coating composition can be applied by means of a curtain coater, a die coater, a roll coater, an air coater, a knife coater, a blade coater, a rod coater, a bar coater, or a comma coater. Application by a curtain coater, such as a curtain coater having one or multiple dies, is preferred.

The ink-receiving layer (b) can be coated onto the substrate in more than one partial ink-receiving layers, i.e. in partial ink-receiving layers having varying compositions. The two or more partial ink-receiving layers together form the ink-receiving layer (b) as defined in the claims. For example, the adaption of the boehmite particles to polymeric binder ratio in the single partial layers allows the graduation of properties such as absorptivity and fixing ability.

The dry coating weight of the ink-receiving layer is in the range of from 5 to less than 25 g/m$^2$, preferably from 15 to 22 g/m$^2$. The actual dry coating weight can be adapted to the intended use of the inkjet printable flexible film, for example to the type of printer employed to print the inkjet printable flexible film. The ink receptivity and the drying time can be controlled by selecting an appropriate dry coating weight.

Typically, the ink-receiving layer (b) is a microporous layer, i.e. a layer having an average pore diameter of less than 0.5 µm, preferably less than 0.2 µm as determined by gas adsorption according to DIN 66135-1 on a peeled off and pulverized layer after drying at 130° C. for 1 h. In preferred embodiments the ink-receiving layer has a pore volume being in the range of from 0.3 ml/g to 1.0 ml/g, preferably of from 0.4 to 0.7 ml/g. The pore volume of the ink-receiving layer is determined by contacting the ink-receiving layer of the film sample with 1-methoxy-2-propanol in order to fill the pores of the ink-receiving layer with the liquid and calculating the pore volume from the weight difference of the dry coating and the 1-methoxy-2-propanol saturated coating after removing excess liquid from the surfaces using a density of 0.92 g/cm$^3$ for the 1-methoxy-2-propanol.

The ink-receiving layer (b) can be the sole ink-receiving layer present in the inkjet printable flexible film. However, in some embodiments the inkjet printable flexible film can comprise an additional ink-receiving layer different from the ink-receiving layer (b) and applied on top of the ink-receiving layer (b). The additional ink-receiving layer is referred to as ink-receiving top layer (f) in the following.

The ink-receiving top layer (f) can be applied, for example, in order to improve the scratch resistance and/or to reduce the sliding resistance. Preferably, the ink-receiving top layer comprises particles as defined above further particles in the ink-receiving layer (b) in addition to the boehmite particles. The particles present in the ink-receiving top layer (f) are typically smaller than the further particles in the ink-receiving layer (b). Preferably, they have a particle size ($d_{50}$, volume mean) of 1 to 6 µm, as determined by laser diffraction according to ISO 13320.

The surface of the ink-receiving layer (b) or the ink-receiving top layer (f), if present, can have a matte, semi-matte, or glossy appearance having gloss values varying from 1 to 90 GU (gloss units), typically from 20 to 80 GU as determined at a measuring angle of 60° according to ISO 2813. Preferably, the ink-receiving layer has a glossy appearance such as silk gloss (about 10 to 40 GU) or high gloss (about 40 to 80 GU). The gloss value can be adapted by adding coarser particles as described above.

The biaxially oriented polymer film (a) and the ink-receiving layer (b) are either in direct contact with each other or one or more intermediate layers (c) are present between the biaxially oriented polymer film (a) and the ink-receiving layer (b). Preferably, the ink-receiving layer is not in direct contact with a layer consisting of polyethylene. The intermediate layer (c) can have various effects, for example, it can function as an adhesion promoting layer (primer).

An adhesion promoting layer (c) improves the wettability of the biaxially oriented polymer film and its adhesion to the adjacent ink-receiving layer and thus results in an increase of composite strength. BOPP and BOPET films are typically coated with an adhesion promoting layer before the ink-receiving layer is formed thereon. Exemplary materials for the adhesion promoting layer, including for application on BOPP and BOPET films, are acrylic polymers, such as poly(meth)acrylates and copolymers comprising (meth)acrylates, poly(vinyl acetate)s, and polyurethanes, as well as copolymers and blends of these polymers. Optionally, the adhesion promoting layer may contain boric acid and/or borates such as sodium tetraborate decahydrate and potassium tetraborate decahydrate. The thickness of the adhesion promoting layer can vary from about 10 nm to 10 µm. Biaxially oriented polymer films, especially BOPP and BOPET films, already coated with an adhesion promoting layer are commercially available, e.g. Hostaphan® RNK 2CSR. In these cases, the thickness of the adhesion promoting layer is generally less than 1 µm, typically from 10 to 200 nm. Commercially available polymer films already coated with an adhesion promoting layer are often coated on both surfaces meaning that an additional adhesion promoting layer can also be present on the surface of the biaxially oriented polymer film (a) far from the ink-receiving layer (b) as a lower layer. Commercially available polymer films already coated with an adhesion promoting layer can also be coated with a further adhesion promoting layer.

It is understood that the adhesion promoting layer (c) can be subjected to a corona treatment to further improve adhesion to the ink-receiving layer (b).

Other lower layers can be present below the biaxially oriented polymer film (a), i.e. on the surface of the biaxially oriented polymer film (a) far from the ink-receiving layer (b). The lower layer is preferably a barrier layer (g) such as a metal or metal oxide layer. For cost reasons aluminum is the preferred metal for metallization of the biaxially oriented polymer film. Suitable metal oxides to be used as barrier layer include siliconoxide (SiOx) and aluminumoxide (AlOx). Metallization and metal oxide coating is usually performed by physical vapor deposition and accordingly, the thickness of the metal or metal oxide layer is typically from 10 to 150 nm.

Alternatively, the barrier layer (g) can be a thin metal foil, typically having a thickness of from 6 to 30 µm, which is laminated to the inkjet printable flexible film to result in a multilayer laminate. Preferred metal foils are aluminum and aluminum alloy foils. The metal foil can be laminated to the surface of the biaxially oriented polymer film (a) far from the ink-receiving layer (b) or onto the printed surface of the ink-receiving layer (b) in case of reverse printing on a transparent film as explained below.

The barrier layer (g) can also be a polymer film having barrier properties such as a polymer film comprising an ethylene/vinyl alcohol copolymer (EVOH), e.g. EVOH coextruded with polyethylene (PE) or polypropylene (PP).

When a white opaque biaxially oriented polymer film is used as the substrate, the opacity of the inkjet printable flexible film is preferably at least 50%, more preferably at least 60%, even more preferably at least 70%, and most preferably at least 75%, as determined according to ISO 2471. The brightness (lightness) L* of the printable surface of a white opaque inkjet printable flexible film is preferably at least 88, more preferably at least 90, as determined according to ISO 13655.

When a transparent biaxially oriented polymer film is used as the substrate, the inkjet printable flexible film is preferably transparent as well. Transparency within the meaning of the present invention denotes a haze of less than 15%, more preferably less than 10%, and most preferably less than 6%, as determined according to ASTM D1003

The inventive ink-receiving layer ensures a high printing quality when subjected to inkjet printing. It quickly absorbs the applied ink and fixes the ink dyes or pigments. Ink-receiving rates of up to 10 ml/m$^2$s or up to 20 ml/m$^2$ can be reached. Thus, the present inkjet printable flexible film is suitable for high speed inkjet printing providing instant drying of the ink and operating with printing speeds from 15 to 300 m/min, typically from 30 or 60 to 300 m/min, such as high speed digital inkjet printing, e.g. high speed single pass inkjet printing. A high printing quality means high image resolution without any print artifacts such as bleeding, blurring, coalescence and mottling; a high color gamut, color saturation, and color brilliance. The inkjet printing quality achieved with the present inkjet printable flexible film and suitable inks often exceeds that of conventional flexographic and intaglio printing.

Any aqueous (water-based) inkjet ink can be used for printing on the ink-receiving layer of inventive inkjet printable flexible film. Suitable aqueous inks include both dye-based inks comprising water-soluble dyes and/or dye clusters and pigment-based comprising dispersed pigment with pigment-based inks being preferred. Depending on the intended use of the printed inkjet printable flexible film the aqueous ink is preferably safe for use on food packaging, i.e. it does not contain substances which migrate through the layers of the inkjet printable flexible film into a packaged good leading to non-compliant food. Edible inks can be used for food packaging but are not mandatory. Other inks which do not contain substances that migrate through the layers can also be applied to the ink-receiving layer if the inkjet printable flexible film is intended for food packaging.

Preferably, aqueous inks with a low tendency for migration are used for printing, more preferably pigment-based inks comprising no or only low amounts (total amount of less than 20 weight %, based on the total weight of the ink) of polymeric dispersing agents and humectants, such as glycerol, 1,2-propane diol, 1,3-propane diol, poly(ethylene glycol), and poly(propylene glycol).

Mostly, a four ink CMYK (cyan, magenta, yellow, and black) system is used for printing on the ink-receiving layer of the inventive inkjet printable flexible film. However, special colors, e.g. blue, green, orange, red and particularly white or silver, may be used as well.

In case of a transparent inkjet printable flexible film the ink-receiving layer can be printed by either face printing or reverse printing. Face printing means that a non-mirror image is printed on the ink-receiving layer located on the surface of biaxially oriented polymer film on the far side from the filling to be packed by the inkjet printable flexible film. Typically, white ink is used in a first step to obtain an appropriate back color for sufficient color density before the colored inks (e.g. CMYK system) are applied. The white ink for the back color can be applied by inkjet printing or any other conventional printing technique such as flexo or offset printing on the surface of the film far from the ink-receiving layer. Reverse printing means that a mirror image is printed on the ink-receiving layer located on the surface of biaxially oriented polymer film facing the filling to be packed by the inkjet printable flexible film. Typically, white ink is used in a last step to obtain an appropriate back color for sufficient color density after the colored inks (e.g. CMYK system) have been applied. The white ink for the back color can be applied by inkjet printing or by any other conventional printing technique such as flexo or offset printing. When reverse printing is performed the printing on the ink-receiving layer is typically separated from the filling by an additional layer applied over the printed surface. The additional layer can be any of the layers/films described below, e.g. a not biaxially oriented polymer film (d), a sealing layer/film (e), and/or a second biaxially oriented polymer film (a2).

Advantageously, the inventive inkjet printable flexible film is printed with a digital inkjet printer running with high printing speed such a printing speeds from 30 to 300 m/min, preferably comprising a single pass printing system, i.e. a printing system comprising a stationary printing bar over the web width which bar comprises the printing heads. Exemplary high speed single pass inkjet digital presses for aqueous inks are commercially available from Hewlett Packard (PageWide Industrial Presses), Kodak (Prosper, Versamark), Canon (ImagePress), KBA (RotaJet), Palis (Padaluma Printing), AstroNova/Trojan, Afinia, and Rigoli. High speed single pass inkjet printers are typically operated with piezo printing heads, for example available from Fujifilm Dimatix (e.g. SAMBA printing head), Kyocera, Ricoh, and Xaar, with continuous ink jet print heads, e.g. from Kodak, or with printing heads and printing bars, respectively, available from Memjet.

Since the biaxially oriented polymer film (a) generally has a high initial tear strength but a low propagation tear resistance, the present inkjet printable flexible film can be laminated to at least one not biaxially oriented polymer film (d) to improve the propagation tear strength. The thus obtained multilayer laminate may comprise the additional not biaxially oriented polymer film (d) on one surface, either on the printed ink-receiving layer (b) or on the rear of the biaxially oriented polymer film (a) (on the surface far from the ink-receiving layer) or on both surfaces of the inkjet printable flexible film. Typically, the not biaxially oriented polymer film is an extruded or coextruded polymer film. Suitable not biaxially oriented polymer materials for the polymer film (d) include polyamide, polypropylene (e.g. cPP), amorphous poly(ethylene terephthalate) (APET), glycol-modified poly(ethylene terephthalate) (PET-G), and polylactide (e.g. cPLA). These films can be produced e.g. in a cast extrusion process (designated with a "c") or blow extrusion process. An example of a coextruded not biaxially oriented polymer film (d) is a film comprising an inner layer of PP and out layer(s) improving film properties such sealing properties, coefficient of friction, adhesion to adhesives, coatings or printing. Exemplary combinations of biaxially oriented polymer film (a)/not biaxially oriented polymer film (d) that can be used within the multilayer laminate include combinations of the same type of polymer such as BOPP/cPP, BOPET/APET, BOPET/PET-G, BOPLA/cPLA. The preferred thickness of the not biaxially oriented polymer film (d) is within the range from 10 to 100 µm. In some embodiments the not biaxially oriented polymer film (d) is a sealable film as described below, e.g. a heat-sealing film.

If used as a packaging material the inkjet printable flexible film usually will be processed to the final package by a sealing operation such as heat sealing, ultrasonic sealing, solvent sealing or pressure sealing. Thus, the presence of a sealing layer (e) as one of the outer layers is preferred. The sealing layer (e) is located either on the printed ink-receiving layer (b) or any optional ink-receiving top layer (f) if the inkjet printable flexible film has been printed by reverse printing or on the rear of the biaxially oriented polymer film (a) (on the surface far from the ink-receiving layer) if the inkjet printable flexible film has been printed by face printing.

The sealing layer (e) can be a heat-sealing layer, a layer for ultrasonic sealing, a layer for solvent sealing and a pressure-sealing layer. The thickness of the sealing layer can range from 1 to 100 μm. Preferably it is a heat-sealing layer.

A heat-sealing layer (e) can be applied in the form of a heat-sealing film which is laminated to the inkjet printable flexible film to result in a multilayer laminate or in the form of a heat-sealing lacquer coated onto the inkjet printable flexible film. Suitable materials for the heat-sealing layer are polymeric materials having a heat seal temperature of from 70 to 200° C. which is preferably at least 10° C. lower than the melting temperature of the material of the biaxially oriented polymer film. The heat-sealing film can be identical with the not biaxially oriented polymer film (d), i.e. the not biaxially oriented polymer film (d) is heat-sealable and thus can also function as the heat-sealing layer (e). Exemplary materials for the heat-sealing film include those mentioned above for the not biaxially oriented polymer film (d) as well as polyethylene such as low density polyethylene (LDPE), linear low density polyethylene (LLDPE), polyethylene copolymers, e.g. with acrylic acid, polypropylene (co)polymers, poly(vinylidene fluoride), poly(vinyl acetate), poly (meth)acrylates, and polyesters. Exemplary heat-sealing lacquers include polymer dispersions and emulsions (such as modified ethylene/acrylic acid copolymer (e.g. TECSEAL® available from TrUb Chemie) as well as solvent (e.g. poly (vinylidene chloride) and vinylacetate copolymers) or hot melt based materials. The preferred thickness of the heat-sealing film is within the range from 10 to 100 μm. The preferred thickness of the heat-sealing lacquer coat or coextruded sealing layers (e.g. coextruded with the not biaxially oriented polymer as described above) is within the range from 1 to 20 μm.

It is understood that the mention of the optional layers/films of the inventive inkjet printable flexible film and the multilayer laminate is not exhaustive, i.e. further layers/films not specifically described herein may be present. For example, the multilayer laminate of the present invention can also comprise a second biaxially oriented polymer film (a2).

The not biaxially oriented polymer film (d), the metal foil (g), second biaxially oriented polymer film (a2), and/or the sealing film (e) can be laminated to the inkjet printable flexible film by any laminating process using conventional laminating adhesives, such as dry lamination with either aqueous (water-based) or solvent-based adhesives; solvent-free lamination with 1-component or 2-component adhesive systems; hot-melt lamination with hot-melt adhesives or extrusion glues, e.g. on the basis of polyolefins, and lamination with radiation-curable adhesives. Preferred adhesives are water-based or solvent-free adhesives on the basis of polymers or prepolymers such as poly(meth)acrylates and polyurethanes. The adhesive may contain additional components such as crosslinking agents, plasticizers, tackifiers, and colorants. The type of adhesive, including type and amount of additives, used for lamination depends on the intended use of the multilayer laminate. In case of use as a food packaging material the relevant legal regulations for food must be observed.

The adhesive is typically applied in an amount of from 1 g/m² to 20 g/m², preferably from 2 g/m² bis 6 g/m².

When the not biaxially oriented polymer film (d), the metal foil (g), and/or the sealing film (e) are applied to the rear of the biaxially oriented polymer film (a) a corona treatment of the rear of the biaxially oriented polymer film is advantageous to improve adhesion.

It is understood that the above-mentioned additional layers, film and foils can be present in any feasible combination and sequence with the proviso that the sealing layer (e) is one of the outer layers. Moreover, the inkjet printable flexible film/multilayer laminate of the present invention may comprise further layers which are not specifically discussed herein. Examples include paper, cardboard, fabrics, composites and combinations thereof.

Non-limiting exemplary sequences of layers of the inventive inkjet printable flexible film/multilayer laminate (adhesive layers in the multilayer laminates are not shown) include:

--- ink-receiving layer (b)
biaxially oriented polymer film (a)
ink-receiving layer (b)
adhesion promoting layer (c)
biaxially oriented polymer film (a)
ink-receiving top layer (f)
ink-receiving layer (b)
biaxially oriented polymer film (a)
ink-receiving layer (b)
adhesion promoting layer (c)
biaxially oriented polymer film (a)
barrier layer (g): metal or metal oxide layer or metal foil
barrier layer: metal foil
printed ink-receiving layer (b)
adhesion promoting layer (c)
transparent biaxially oriented polymer film (a)
ink-receiving layer (b)
adhesion promoting layer (c)
biaxially oriented polymer film (a)
not biaxially oriented polymer film (d)
not biaxially oriented polymer film (d)
printed ink-receiving layer (b)
adhesion promoting layer (c)
transparent biaxially oriented polymer film (a)
sealing layer (e): lacquer or film
biaxially oriented polymer film (a2)
printed ink-receiving layer (b)
adhesion promoting layer (c)
transparent biaxially oriented polymer film (a)
ink-receiving layer (b)
adhesion promoting layer (c)
biaxially oriented polymer film (a)
sealing layer (e): lacquer or film
sealing layer (e): lacquer or film
printed ink-receiving layer (b)
adhesion promoting layer (c)
transparent biaxially oriented polymer film (a)
ink-receiving layer (b)
adhesion promoting layer (c)
biaxially oriented polymer film (a)
barrier layer (g): metal or metal oxide layer or metal foil
not biaxially oriented polymer film (d)
sealing layer (e): lacquer or film
sealing layer (e): lacquer or film
not biaxially oriented polymer film (d)
barrier layer: metal foil
printed ink-receiving layer (b)
adhesion promoting layer (c)
transparent biaxially oriented polymer film (a)

---

In preferred embodiments the total thickness of the inkjet printable flexible film/multilayer laminate is within the range of from 12 to 110 μm, more preferably from 25 to 75 μm. The grammage of the inventive inkjet printable flexible film/multilayer laminate preferably ranges from 13 to 100 g/m², more preferably from 26 to 80 g/m². The thickness and the grammage of the inkjet printable flexible film/multilayer laminate can be determined according to ISO 534 and ISO 536, respectively.

When the additional layer(s) (apart from any ink-receiving top layer (f)) are present only on the rear of the biaxially oriented polymer film (a) the inkjet printable flexible film/multilayer laminate can be printed before or after application of the additional layer(s).

The printed inkjet printable flexible film or multilayer laminate can be processed to the intended packaging by standard operations including heat sealing, ultrasonic sealing, solvent sealing, pressure sealing, and gluing.

The packaging comprising printed inkjet printable flexible film or multilayer laminate is typically a flexible packaging or a packaging having at least one flexible part and preferably is selected from flexible bags, flexible pouches, flexible sachets, flexible tubes or containers having a flexible lidding. Specific examples include tubular bags, pillow bags, stand-up pouches, block bottom bags and pouches, flat bottom bags, gusset bags, tube laminates, and container lids.

The printing of the inventive inkjet printable flexible film or multilayer laminate can also be part of a form fill seal process known in the art for making a filled packaging, wherein the process comprises the steps of:

(i) providing the ink-receiving layer of the inkjet printable flexible film or the multilayer laminate with a print by means of inkjet printing using water-based inks;

(ii) bringing the printed flexible film or multilayer laminate into the desired shape to form an open packaging;

(iii) filling the open packaging; and (iv) sealing the printed flexible film or multilayer laminate by means of gluing, heat, ultrasonic and/or organic solvents to close the packaging, with steps (i) to (iv) being performed inline.

When in step (i) a transparent inkjet printable flexible film is printed by reverse printing, the form fill seal process can further comprise the step(s) of coating the printed flexible film or multilayer laminate obtained in step (i) with a coating composition and/or laminating it with at least one additional material prior to step (ii).

In particular, the inventive inkjet printable flexible film and the multilayer laminate are suitable as printable packaging material for food, especially for coffee (e.g. in the form of capsules) and tea bags, lids for yoghurt cups and similar cups for dairy products; beverages; pet food; seeds; pharmaceuticals (e.g. lids for containers); personal care products such tooth paste, and liquids such as adhesives.

EXAMPLES

Example 1

Preparation of Aqueous Coating Composition for the Ink Receptive Layer (Coating Composition A):

6 g of 25 weight % of hydrochloric acid and 0.8 g of boric acid were added to 500 ml of water in a 2000 ml beaker while stirring. Stirring was continued and 260 g of boehmite (DISPERAL® HP 14, available from Sasol) were added slowly to obtain a dispersion of boehmite particles.

In a separate step, the binder solution was prepared by adding 27 g of poly(vinyl alcohol) having a degree of hydrolysis of from 86.7 to 88.7 mol % and a 4 weight % aqueous solution viscosity of 38-42 mPa·s (Mowiol® 40-88, available from Kuraray) to 200 g of cold water in a 400 ml beaker while stirring. The suspension was heated to about 90° C. while stirring with a blade agitator until the poly (vinyl alcohol) was dissolved.

The still hot binder solution was poured into the boehmite dispersion under stirring. Cold water was added under stirring in order to adjust the total volume of the aqueous coating composition to 1000 ml. It was stirred for further 30 minutes and temperature decreased to about 45° C.

The solid content of the dispersion was about 28.9% by weight with a boehmite to poly(vinyl alcohol) weight ratio of about 9.6:1.

Application of aqueous coating composition to prepare ink-receiving layer:

One surface of a 23 μm thick transparent biaxially oriented PET (BOPET) film coated with a thin polyacrylate coating on one surface (Hostaphan® RNK 2CSR from Mitsubishi) was subjected to a corona treatment. The still warm aqueous coating composition was applied uniformly to the corona-treated surface of the film using a film drawing device from Erickson with a coating bar to obtain a coating weight of about 60 g/m². Afterwards, the coating was dried in a laboratory drying oven at 100° C. for 5 minutes to a dry coating weight of 17.5 g/m². The resulting microporous ink-receiving layer has a high gloss.

The structure of the inkjet printable flexible film is as follows:

| | |
|---|---|
| ink-receiving layer (b) | 17.5 g/m² |
| polyacrylate (adhesion promoting layer (c)) | 0.1 g/m² |
| BOPET (biaxially oriented polymer film (a)) | 23 μm (incl. polyacrylate) |

The obtained flexible film is printable on the coated surface with high image quality by inkjet printing, has excellent mechanical properties and can be processed further.

Example 2

The inkjet printable flexible film of Example 1 was laminated with a sealable 20 μm thick cPP film using a solvent-free polyurethane adhesive. The resulting laminate has a grammage of 64 g/m² and a thickness of about 61 μm.

The structure of the multilayer laminate is as follows:

| | |
|---|---|
| ink-receiving layer (b) | 17.5 g/m² |
| polyacrylate (adhesion promoting layer (c)) | 0.1 g/m² |
| BOPET (biaxially oriented polymer film (a)) | 23 μm |
| polyurethane adhesive | 3 g/m² |
| cPP film (not biaxially oriented polymer film (d)/ heat-sealing film (e) | 20 μm |

The obtained multilayer laminate is printable on the coated surface with high image quality by inkjet printing, has excellent mechanical properties and can be processed further, e.g. to a final flexible package of goods in a form fill seal machine.

Coating Compositions B to E:

Coating Composition B:

The aqueous coating composition for the ink receptive layer was prepared as in Example 1 except that 8 g of a gel type silica (Syloid 621 available from W. R. Grace) with a mean particle size of 7.7 to 10.7 μm were added to the boehmite dispersion.

Coating Composition C (Non-Inventive):

A silica based ink-receptive coating was formulated as described in Example 1 of EP 1 655 348 A1.

Coating Composition D (Non-Inventive):

3 g of 25 weight % of hydrochloric acid and 0.4 g of boric acid were added to 250 g of water in a 1 000 ml beaker while stirring. Stirring was continued and 135 g of boehmite (DISPERAL® HP 14, available from Sasol) were added slowly to obtain a dispersion of boehmite particles.

In a separate step, the binder solution was prepared as described in Example 1.

The still hot binder solution was poured into the boehmite dispersion under stirring. Cold water was added under stirring in order to adjust the total volume of the aqueous coating composition to 750 ml. It was stirred for further 30 minutes and temperature decreased to about 45° C.

The solid content of the dispersion was about 21.7% by weight with a boehmite to poly(vinyl alcohol) weight ratio of about 5:1.

Coating Composition E (Non-Inventive):

6 g of 25 weight % of hydrochloric acid and 0.8 g of boric acid were added to 500 g of water in a 2000 ml beaker while stirring. Stirring was continued and 260 g of boehmite (DISPERAL® HP 14, available from Sasol) were added slowly to obtain a dispersion of boehmite particles.

In a separate step, the binder solution was prepared by adding 12 g of poly(vinyl alcohol) having a degree of hydrolysis of from 86.7 to 88.7 mol % and a 4 weight ° A) aqueous solution viscosity of 38-42 mPa·s (Mowiol® 40-88, available from Kuraray) to 100 g of cold water in a 200 ml beaker while stirring. The suspension was heated to about 90° C. while stirring with a blade agitator until the poly (vinyl alcohol) was dissolved.

The still hot binder solution was poured into the boehmite dispersion under stirring. Cold water was added under stirring in order to adjust the total volume of the aqueous coating composition to 1000 ml. It was stirred for further 30 minutes and temperature decreased to about 45° C.

The solid content of the dispersion was about 27.4% by weight with a boehmite to poly(vinyl alcohol) weight ratio of about 21.7:1.

Examples 3 to 9 and Comparative Examples 1 to 7

Further types of base films were coated with Coating Compositions A to D following the procedure described in Example 1:

Sarafil TW 102: BOPET film with a thin polyacrylate coating on one surface, available from Polyplex Melinex 569 transparent BOPET film with a thin polyacrylate coating on one surface available from Dupont Teijin Films BOPET/cPP coextrudate: 23 μm BOPET laminated to 20 μm cPP film coextruded with an outer sealing layer Rayoface WZ55: BOPP film coextruded with two heat-sealable copolymer layers on both surfaces, available from Innovia Inkjet printable flexible films according to the invention (Examples 3 to 9.) and comparative films (Comparative Examples 1 to 7) were prepared and their properties are reported in following table. In Example 6 a thin topcoat comprising polystyrene plastic beads having a unimodal diameter distribution with a mean diameter of 4 μm and colloidal silica in a weight fraction of 1:10 was applied by reverse gravure coating to yield a coating weight of about 0.1 g/m².

Applied Test Methods:

Thickness is determined according to ISO 534 in μm.

The gloss of the ink-receptive coating is determined according to ISO 2813 at an angle of 60 degrees in GU.

The opacity is determined according to ISO 2471 in %.

The haze is determined according to ASTM D1003 in %.

The stiffness is determined according to ISO 2493 (L&W method) with a geometry of 15°/10 mm in mN.

Folding resistance is determined according to Schopper method described in ISO 5626 with 10 double folds on unprinted and black printed specimens. Printed specimens were printed by an Epson ET2700 with black pigmented ink.

Bending resistance is determined by wedge test for brittleness of the coating according to ISO 18907:2000 in cm. Low values indicate a low brittleness of the coating.

The creasing application test is done by creasing a A4 sheet of the inkjet printable flexible film by hand into a small ball with a diameter of about 10 cm followed by unfolding the film over a sheet of paper. Debris or flake-offs of the coating on the underlaying sheet of paper are rated. For unprinted material black paper is used whereas black printed material is investigated on a white sheet of paper. A rating of 1 to 4 is correlated to the amount of coating deposited on the paper: 1=no coating debris; 2=low coating of debris, 3=medium amount of debris, 4=high amount of debris.

The coefficient of friction is determined according to ISO 8295:1995 with a 200 g weight at 300 mm/min drawing speed facing the ink-receptive layer to polished stainless steel or to itself.

The amount of extractables of the ink-receptive coating is evaluated by immersing the coated film into fivefold weight of demineralized water related to the coating weight for one hour. For this a stack of circular film samples are placed into a beaker with the predetermined quantity of water so that the film samples are placed in parallel to the bottom of the beaker. The diameter of the film samples is slightly smaller than the diameter of the beaker. By this procedure the pores of the microporous coating are filled in each layer of the flexible film and the possible present surfactants, low molecular weight PVOH and non-surface-active materials are extracted. After 1 hour the film specimens are removed and dried in an oven at 80° C. The difference in weight compared to the untreated films is determined as the amount of extracted low molecular weight components in %.

The heat-sealing strength of the film backside to itself is determined according to DIN 55529. The maximum force in N is evaluated on samples sealed at 190° C. with 200 N for 1 sec on a specimen width of 15 mm sealing an area of 15 mm length across the specimen and 20 mm width. Heat seal release from sealing bar is determined under the same conditions.

The print performance is evaluated by roll-to-roll printing with a KBA Rotajet digital press with aqueous pigmented inks comprising Fujifilm Dimatix Samba printheads at a printing speed of 150 m/min with a resolution of 1200×1200 dpi. The maximum ink load is controlled by the software means in order to avoid oversaturation of the ink jet coating. A test print is run to judge color gamut, color saturation, print sharpness and resolution as well as for artefacts like bleeding, blurring, mottling or coalescence. A rating of 1 to 5 is correlated to the quality of the print: 1=no print artefacts and high color gamut to 5=print with very visible artefacts and/or low color gamut.

TABLE

| Ex. # | Ex. 3 | Ex. 4 | Ex. 5 | Ex. 6 | Ex. 7 | Ex. 8 | Ex. 9 |
|---|---|---|---|---|---|---|---|
| Base film | Sarafil | Sarafil | Sarafil | Sarafil | Hostaphan | BOPET/.cPP | Rayoface |
| Thickness of base film (μm) | 23 | 23 | 23 | 23 | 23 | 45 | 55 |

TABLE-continued

| | | | | | | | |
|---|---|---|---|---|---|---|---|
| Coating weight (g/m$^2$) | 8 | 15 | 22 | 22 | 21 | 15 | 15 |
| Coating Composition | A | A | A | A + Top | A | A | B |
| 60° Gloss (GU) | 58 | 50 | 52 | 52 | 60 | 55 | 23 |
| Opacity (%) | 79 | 79 | 79 | 79 | — | 79 | 85 |
| Haze (%) | — | — | — | — | 6 | — | — |
| Stiffness (mN) | 3 | 4 | 7 | 7 | 7 | 13 | 15 |
| Folding resistance unprinted | ok | ok | ok | ok | ok | ok | ok |
| Folding resistance printed | ok | ok | ok | ok | ok | ok | ok |
| Wedge Test for Brittleness (cm) | 0 | 0 | 0 | 0 | 0 | 0 | 0 |
| Crease resistance | 1 | 1 | 1 | 1 | 1 | 1 | 1 |
| CoF static Coating vs. Coating | — | 0.64 | — | 0.40 | 0.80 | 0.63 | 0.59 |
| CoF dynamic Coating vs. Coating | — | 0.56 | — | 0.38 | 0.77 | 0.63 | 0.57 |
| CoF static Coating vs. Stainless Steel | — | 0.38 | — | 0.30 | 0.40 | 0.43 | 0.40 |
| CoF static Coating vs. Stainless Steel | — | 0.30 | — | 0.27 | 0.30 | 0.30 | 0.28 |
| Amount of extractables (%) | — | 0.40 | — | — | — | — | — |
| Heat seal strength (N) | — | — | — | — | — | 26 | 35 |
| Heat seal release | — | — | — | — | — | excellent | excellent |
| Print performance | 2 | 1 | 1 | 1 | 1 | 1 | 1 |

| Ex. # | CEx. 1 | CEx. 2 | CEx. 3 | CEx. 4 | CEx. 5 | CEx. 6 | CEx. 7 |
|---|---|---|---|---|---|---|---|
| Base film | Sarafil | Sarafil | Melinex | Melinex | Sarafil | Sarafil | Sarafil |
| Thickness of base film (μm) | 23 | 23 | 96 | 96 | 23 | 23 | 23 |
| Coating weight (g/m$^2$) | 3 | 29 | 38 | 22 | 20 | 15 | 15 |
| Coating Composition | A | A | A | A | C | D | E |
| 60° Gloss (GU) | 60 | 54 | 60 | 58 | 40 | 53 | 43 |
| Opacity (%) | 79 | 79 | — | — | 79 | 79 | 79 |
| Haze (%) | — | — | 10 | 7 | — | — | — |
| Stiffness (mN) | 3 | 11 | 180 | 165 | 6 | 4 | 4 |
| Folding resistance unprinted | ok | cracking | cracking | cracking | cracking | ok | cracking |
| Folding resistance printed | ok | cracking | cracking | slight cracking | cracking | ok | cracking |
| Wedge Test for Brittleness (cm) | 0 | 1.5 | 5 | 1.1 | 2.6 | 0 | 4.8 |
| Crease resistance | 1 | 2 | 3 | 2 | 4 | 1 | 3 |
| CoF static Coating vs. Coating | — | — | 0.90 | — | 0.77 | — | — |
| CoF dynamic Coating vs. Coating | — | — | 0.85 | — | 0.77 | — | — |
| CoF static Coating vs. Stainless Steel | — | — | 0.31 | — | 0.79 | — | — |
| CoF static Coating vs. Stainless Steel | — | — | 0.27 | — | 0.45 | — | — |
| Amount of extractables (%) | — | — | — | — | 1.60 | — | — |
| Heat seal strength (N) | — | — | — | — | — | — | — |
| Heat seal release | — | — | — | — | — | — | — |
| Print performance | 4 | 1 | 1 | 1 | 2 | 4 | 4 |

"—" means not measured

It is evident form the experimental data that only the inventive inkjet printable flexible films provide the desired combination of flexibility, good crack resistance (high folding resistance, low brittleness and high crease resistance), and good printability. Moreover, the amount of low molecular substances that can be extracted from the film has been measured for Example 4 and the relatively low value (including mainly low molecular poly(vinyl alcohol)) confirms that the inkjet printable flexible film can be used for food packaging applications.

Aspects of the Invention:

Aspect 1: An inkjet printable flexible film for packaging applications comprising:

(a) a biaxially oriented polymer film having a thickness in the range of from 8 to 70 μm; and (b) at least one ink-receiving layer comprising boehmite particles and poly(vinyl alcohol) having a degree of hydrolysis of from 78 to 96 mol % in a weight ratio ranging from 6.5:1 to 20:1 coated over one surface of the biaxially oriented polymer film at a dry coating weight being in the range of from 5 to less than 25 g/m$^2$, wherein the ink-receiving layer (b) is formed by (i) applying an aqueous coating composition comprising boehmite particles, an acidic dispersing agent, poly(vinyl alcohol), and boric acid and/or a borate, or (ii) applying boric acid and/or a borate in a first step and then an aqueous coating composition comprising boehmite particles, an acidic dispersing agent, poly(vinyl alcohol), and optionally further boric acid and/or borate.

Aspect 2: The inkjet printable flexible film according to aspect 1, wherein the ink-receiving layer is formed by method (i).

Aspect 3: The inkjet printable flexible film according to aspects 1 or 2, wherein the weight ratio of boehmite particles to poly(vinyl alcohol) is within the range of from 7:1 to 15:1, preferably from 7.5:1 to 14:1, and more preferably from 8:1 to 12:1.

Aspect 4: The inkjet printable flexible film according to any one of aspects 1 to 3, wherein the acidic dispersing agent is an organic and/or inorganic acid having a $pk_a$ value lower than 5.0.

Aspect 5: The inkjet printable flexible film according to aspect 4, wherein the acidic dispersing agent is an inorganic acid having a pka of less than 2.0 such as hydrochloric acid.

Aspect 6: The inkjet printable flexible film according to any one of aspects 1 to 5, wherein the acidic dispersing agent is used in an amount of from >0 to 10 weight %, preferably from 1 to 5 weight %, each based on the amount of boehmite particles.

Aspect 7: The inkjet printable flexible film according to any one of aspects 1 to 6, wherein boric acid and/or the borate is used in a total amount of from >0 to 10 weight %, preferably from 1 to 8 weight %, and more preferably from 3 to 7 weight %, each calculated as H3BO3 and based on the amount of poly(vinyl alcohol).

Aspect 8: The inkjet printable flexible film according to any one of aspects 1 to 7, wherein the ink-receiving layer (b) comprises boron in an amount of less than 60 mg/m2, preferably less than 40 mg/m2, more preferably less than 30 mg/m2, and most preferably less than 20 mg/m2 in the dry coating.

Aspect 9: The inkjet printable flexible film according to any one of aspects 1 to 8, wherein the poly(vinyl alcohol) has degree of hydrolysis of from 80 to 95 mol %, preferably from 82 to 94 mol %, more preferably from 84 to 93 mol %, or from 86 to 92.5 mol %.

Aspect 10: The inkjet printable flexible film according to any one of aspects 1 to 9, wherein the poly(vinyl alcohol) has weight average molecular weight of at least 100.000 g/mol, preferably at least 120.000 g/mol, and more preferably at least 150.000 g/mol.

Aspect 11: The inkjet printable flexible film according to any one of aspects 1 to 10, wherein the viscosity of a 4 weight % aqueous solution of the poly(vinyl alcohol) at 20° C. is from is from 15 to 150 mPa·s, more preferably from 25 to 80 mPa·s.

Aspect 12: The inkjet printable flexible film according to any one of aspects 1 to 11, wherein the ink-receiving layer (b) does not contain any fluorinated acrylic polymer.

Aspect 13: The inkjet printable flexible film according to any one of aspects 1 to 12, wherein the poly(vinyl alcohol) is the sole binder polymer in the ink-receiving layer (b).

Aspect 14: The inkjet printable flexible film according to any one of aspects 1 to 13, wherein the biaxially oriented polymer film (a) comprises a thermoplastic material preferably selected from the group consisting of polyesters, polyolefins, polystyrenes, polyamides, and blends and copolymers thereof, and more preferably selected from the group consisting of poly(ethylene terephthalate)s, poly(ethylene naphthalate)s, polylactides, polypropylenes, polyamides and blends and copolymers thereof.

Aspect 15: The inkjet printable flexible film according to any one of aspects 1 to 14, wherein the biaxially oriented polymer film (a) is a biaxially oriented polypropylene (BOPP) film or a biaxially oriented poly(ethylene terephthalate) (BOPET) film.

Aspect 16: The inkjet printable flexible film according to any one of aspects 1 to 15, wherein the biaxially oriented polymer film (b) is transparent.

Aspect 17: The inkjet printable flexible film according to any one of aspects 1 to 16, wherein the biaxially oriented polymer film (a) and the ink-receiving layer (b) are in direct contact with each other.

Aspect 18: The inkjet printable flexible film according to any one of aspects 1 to 16 further comprising at least one intermediate layer (c) between the biaxially oriented polymer film (a) and ink-receiving layer (b), with the proviso that the ink-receiving layer is not in direct contact with a layer consisting of polyethylene, wherein the intermediate layer (c) is preferably an adhesion promoting layer.

Aspect 19: The inkjet printable flexible film according to aspect 18 wherein the intermediate layer (c) contains boric acid and/or a borate according to method (ii).

Aspect 20: The inkjet printable flexible film according to aspects 18 or 19, wherein the intermediate layer (c) is an adhesion promoting layer comprising a polymer selected from poly(meth)acrylates, copolymers comprising (meth)acrylates, poly(vinyl acetate)s, polyurethanes, and copolymers and blends of these polymers.

Aspect 21: The inkjet printable flexible film according to any one of aspects 1 to 20, wherein the ink-receiving layer (b) comprises less than 1 weight %, preferably less than 0.5 weight %, more preferably less than 0.1 weight %, based on the total weight of the ink-receiving layer, of non-polymeric low molecular organic compounds having a molecular weight of less than 1.000 g/mol other than the residues of any organic dispersing agent, and most preferably is free of such organic compounds.

Aspect 22: The inkjet printable flexible film according to any one of aspects 1 to 21, wherein the ink-receiving layer (b) comprises further particles in addition to the boehmite particles, preferably selected from silica particles, polymeric particles, and mixtures thereof, in an amount of no more than 20 weight %, preferably no more than 5 weight %, based on the total dry weight of the ink-receiving layer.

Aspect 23: The inkjet printable flexible film according to aspect 22, wherein the ink-receiving layer (b) comprises further particles selected from precipitated silicas, fumed silicas, gel type silicas, colloidal silicas, preferably gel type silicas.

Aspect 24: The inkjet printable flexible film according to aspects 22 or 23, wherein the ink-receiving layer (b) comprises further particles selected from polymeric particles comprising polymers or copolymers of ethylene, propylene, styrene, tetrafluoroethylene, and (meth)acrylates, e.g. polymethylmethyacrylate and styrene/methylmethacrylate copolymer; polyamides; polyesters; and/or starch.

Aspect 25: The inkjet printable flexible film according to any one of aspects 22 to 24, wherein the ink-receiving layer (b) comprises silica particles in an amount of >0 to 12 weight %, preferably >0 to 5 weight %, and/or polymer particles in an amount of >0 to 10 weight %, preferably >0 to 5 weight %, each based on the total dry weight of the ink-receiving layer.

Aspect 26: The inkjet printable flexible film according to any one of aspects 1 to 25, wherein the ink-receiving layer (b) is coated over the biaxially oriented polymer film (a) or any optional intermediate layer (c) at a dry coating weight being in the range of from 10 to 24 g/m2, preferably of from 12 to 22 g/m$^2$, and more preferably of from 15 to 20 g/m$^2$.

Aspect 27: The inkjet printable flexible film according to any one of aspects 1 to 26, wherein the ink-receiving layer has a pore volume being in the range of from 0.3 ml/g to 1.0 ml/g, preferably of from 0.4 to 0.7 ml/g.

Aspect 28: The inkjet printable flexible film according to any one of aspects 1 to 27 comprising the ink-receiving layer as defined in (b) as the sole ink-receiving layer.

Aspect 29: The inkjet printable flexible film according to any one of aspects 1 to 28 further comprising at least one ink-receiving top layer (f).

Aspect 30: The inkjet printable flexible film according to aspect 29, wherein the ink-receiving top layer (f) comprises silica particles and polymeric particles, preferably defined as in any one of aspects 22 to 24.

Aspect 31: The inkjet printable flexible film according to any one of aspects 1 to 30 further comprising at least one lower layer, preferably a barrier layer (g), below the biaxially oriented polymer film (a).

Aspect 32: The inkjet printable flexible film according to aspect 31, wherein the barrier layer (g) is a metal or metal oxide layer.

Aspect 33: The inkjet printable flexible film according to any one of aspects 1 to 32 which is transparent.

Aspect 34: The inkjet printable flexible film according to any one of aspects 1 to 32, wherein the biaxially oriented polymer film (b) is a white film.

Aspect 35: The inkjet printable flexible film according to any one of aspects 1 to 34 further comprising a sealing layer (e) as an outer layer below the biaxially oriented polymer film (a).

Aspect 36: The inkjet printable flexible film according to aspect 35, wherein the sealing layer (e) is selected from a heat-sealing layer, a layer for ultrasonic sealing, a layer for solvent sealing and a pressure-sealing layer, preferably a heat-sealing layer.

Aspect 37: An inkjet printed flexible film obtained by reverse printing of a transparent inkjet printable flexible film according to aspect 33 and further applying a sealing layer (e) as an outer layer over the printed ink-receiving layer (b).

Aspect 38: A multilayer laminate comprising the inkjet printable flexible film according to any one of the preceding aspects 1 to 36 and one or more additional films below the polymer film (a) and/or above the ink-receiving layer (b), if printed.

Aspect 39: The multilayer laminate according to aspect 38 comprising at least one barrier film (g), preferably a polymer film comprising an ethylene/vinyl alcohol copolymer or a metal foil such as an aluminum or copper foil.

Aspect 40: The multilayer laminate according to aspect 38 or 39 comprising at least one not biaxially oriented polymer film (d), preferably comprising not biaxially oriented polypropylene (PP) or propylene copolymer, amorphous poly(ethylene terephthalate) (APET), not biaxially oriented glycol-modified poly(ethylene terephthalate) (PET-G), not biaxially oriented polyamide (PA), and not biaxially oriented polylactide (PLA).

Aspect 41: The multilayer laminate according to any one of aspects 38 to 40 comprising a heat-sealing film (e) as one outer layer, preferably comprising low density polyethylene (LDPE) or linear low density polyethylene (LLDPE).

Aspect 42: The multilayer laminate according to aspects 40 or 41, wherein the not biaxially oriented polymer film (d) is sealable, preferably heat-sealable.

Aspect 43: The multilayer laminate according to any one of aspects 38 to 42, wherein one or more of a barrier film (g), a not biaxially oriented polymer film (d), and a sealing film (e) are located below the biaxially oriented polymer film (a) in any sequence with the proviso that the sealing film (e), if present, is the outer layer.

Aspect 44: The multilayer laminate according to any one of aspects 38 to 42, wherein a transparent inkjet printable flexible film is printed by reverse printing and one or more of a barrier film (g), a not biaxially oriented polymer film (d), a further biaxially oriented polymer film (a2) and a heat-sealing film (e) are located above the printed ink-receiving layer (b) in any sequence with the proviso that the heat-sealing film (e), if present, is the outer layer.

Aspect 45: A packaging comprising the printed inkjet printable flexible film according to any one of aspects 1 to 37 or the printed multilayer laminate according to any one of aspects 38 to 44.

Aspect 46: The packaging according to aspect 45, wherein the packaging is a flexible packaging or a packaging having at least one flexible part and preferably is selected from flexible bags, flexible pouches, flexible sachets, flexible tubes or containers having a flexible lidding.

Aspect 47: Use of an inkjet printable flexible film according to any one of aspects 1 to 36 or a multilayer laminate according to any one of aspects 38 to 43 for preparing a packaging for food, pet food, beverages, pharmaceuticals and/or personal care products.

Aspect 48: Use of a printed inkjet printable flexible film according to any one of aspects 1 to 37, a printed multilayer laminate according to any one of aspects 38 to 44, or a packaging according to aspects 45 or 46 for packaging food, pet food, beverages, pharmaceuticals and/or personal care products.

Aspect 49: A method of making a filled packaging comprising the steps of:

(i) providing the ink-receiving layer of the inkjet printable flexible film according to any one of aspects 1 to 36 or the multilayer laminate according to any one of aspects 38 to 43 with a print by means of inkjet printing using water-based inks;

(ii) bringing the printed flexible film or multilayer laminate into the desired shape to form an open packaging;

(iii) filling the open packaging; and (iv) sealing the printed flexible film or multilayer laminate by means of gluing, heat, ultrasonic and/or organic solvents to close the packaging, wherein steps (i) to (iv) are performed inline as a part of a form fill seal process.

Aspect 50: The method according aspect 49 wherein in step (i) a transparent inkjet printable flexible film is printed by reverse printing and further comprising the step(s) of coating the printed flexible film or multilayer laminate obtained in step (i) with a coating composition and/or laminating it with at least one additional material prior to step (ii).

Aspect 51: A method for preparing a packaging for food, pet food, beverages, pharmaceuticals and/or personal care products comprising processing an inkjet printable flexible film according to any one of aspects 1 to 36 or a multilayer laminate according to any one of aspects 38 to 43 by standard operations including heat sealing, ultrasonic sealing, solvent sealing, pressure sealing, and gluing.

Aspect 52: A method for packaging a product selected from food, pet food, beverages, pharmaceuticals and/or personal care products, the method comprising enclosing the product in a printed inkjet printable flexible film according to any one of aspects 1 to 37, a printed multilayer laminate according to any one of aspects 38 to 44, or a packaging according to aspects 45 or 46.

The invention claimed is:

1. An inkjet printable flexible film for packaging applications comprising:
   (a) a biaxially oriented polymer film having a thickness in the range of from 8 to 70 µm; and
   (b) at least one ink-receiving layer comprising boehmite particles and poly(vinyl alcohol) having a degree of hydrolysis of from 78 to 96 mol % in a weight ratio ranging from 6.5:1 to 20:1 coated over one surface of the biaxially oriented polymer film at a dry coating weight being in the range of from 5 to less than 25 g/m$^2$,
   wherein the ink-receiving layer (b) is formed by
   (i) applying an aqueous coating composition comprising boehmite particles, an acidic dispersing agent, poly(vinyl alcohol), and boric acid and/or a borate, or
   (ii) applying boric acid and/or a borate in a first step and then an aqueous coating composition comprising boehmite particles, an acidic dispersing agent, poly(vinyl alcohol), and optionally further boric acid and/or borate.

2. The inkjet printable flexible film according to claim 1, wherein the acidic dispersing agent comprises formic acid, acetic acid, lactic acid, propionic acid, hydrochloric acid, HBr, HNO$_3$, or sulfamic acid and/or wherein boric acid and/or the borate is used in a total amount of from >0 to 10 weight % each calculated as H$_3$BO$_3$ and based on the amount of poly(vinyl alcohol).

3. The inkjet printable flexible film according to claim 1, wherein the poly(vinyl alcohol) has weight average molecular weight of at least 100,000 g/mol, and
   wherein the poly(vinyl alcohol) has a degree of hydrolysis of from 78 to less than 95 mol %.

4. The inkjet printable flexible film according to claim 1, wherein the biaxially oriented polymer film (a) comprises a thermoplastic material selected from the group consisting of polyesters, polyolefins, polystyrenes, polyamides, and blends and copolymers thereof.

5. The inkjet printable flexible film according to claim 1 further comprising at least one intermediate layer (c) between the biaxially oriented polymer film (a) and ink-receiving layer (b), with the proviso that the ink-receiving layer is not in direct contact with a layer consisting of polyethylene, wherein the intermediate layer (c) is an adhesion promoting layer.

6. The inkjet printable flexible film according to claim 1, wherein the ink-receiving layer (b) comprises less than 1 weight %, based on the total weight of the ink-receiving layer, of non-polymeric low molecular organic compounds having a molecular weight of less than 1,000 g/mol other than the residues of any organic dispersing agent.

7. The inkjet printable flexible film according to claim 1 further comprising a barrier layer (g) below the biaxially oriented polymer film (a) and/or a sealing layer (e) as an outer layer below the biaxially oriented polymer film (a),
   wherein the barrier layer (g) comprises a metal or metal oxide layer, and
   wherein the sealing layer (e) comprises a heat-sealing layer, a layer for ultrasonic sealing, a layer for solvent sealing, or a pressure-sealing layer.

8. The inkjet printable flexible film according to claim 1 which is transparent.

9. An inkjet printed flexible film obtained by reverse printing of a transparent inkjet printable flexible film according to claim 8 and further applying a sealing layer (e) as an outer layer over the printed ink-receiving layer (b).

10. A multilayer laminate comprising the inkjet printable flexible film according to claim 1 and one or more additional films below the polymer film (a) and/or above the ink-receiving layer (b), if printed.

11. The multilayer laminate according to claim 10, wherein the biaxially oriented polymer film (a) of the inkjet printable flexible film comprises a thermoplastic material selected from the group consisting of polyesters, polyolefins, polystyrenes, polyamides, and blends and copolymers thereof.

12. The multilayer laminate according to claim 10, wherein the inkjet printable flexible film further comprises at least one intermediate layer (c) between the biaxially oriented polymer film (a) and ink-receiving layer (b), with the proviso that the ink-receiving layer is not in direct contact with a layer consisting of polyethylene, wherein the intermediate layer (c) is an adhesion promoting layer.

13. The multilayer laminate according to claim 10, wherein the ink-receiving layer (b) of the inkjet printable flexible film comprises less than 1 weight %, based on the total weight of the ink-receiving layer, of non-polymeric low molecular organic compounds having a molecular weight of less than 1,000 g/mol other than the residues of any organic dispersing agent.

14. The multilayer laminate according to claim 10, wherein the inkjet printable flexible film further comprises a barrier layer (g) below the biaxially oriented polymer film (a) and/or a sealing layer (e) as an outer layer below the biaxially oriented polymer film (a),
   wherein the barrier layer (g) comprises a metal or metal oxide layer, and
   wherein the sealing layer (e) comprises a heat-sealing layer.

15. The multilayer laminate according to claim 10 comprising a not biaxially oriented polymer film (d),
   wherein the not biaxially oriented polymer film (d) comprises not biaxially oriented polypropylene (PP) or propylene copolymer, amorphous poly(ethylene terephthalate) (APET), not biaxially oriented glycol-modified poly(ethylene terephthalate) (PET-G), not biaxially oriented polyamide (PA), or not biaxially oriented polylactide (PLA).

16. The multilayer laminate according to claim 10 comprising a heat-sealing film (e) as one outer layer, wherein the heat-sealing film (e) comprises low density polyethylene (LDPE) or linear low density polyethylene (LLDPE).

17. A method of making a filled packaging comprising the steps of:
   (i) providing the ink-receiving layer of the inkjet printable flexible film according to claim 1 with a print by means of inkjet printing using water-based inks;
   (ii) bringing the printed flexible film or multilayer laminate into the desired shape to form an open packaging;
   (iii) filling the open packaging; and
   (iv) sealing the printed flexible film or multilayer laminate by means of gluing, heat, ultrasonic and/or organic solvents to close the packaging,
   wherein steps (i) to (iv) are performed inline as a part of a form fill seal process.

18. The method of claim 17, wherein the inkjet printable flexible film further comprises a barrier layer (g) below the biaxially oriented polymer film (a) and/or a sealing layer (e) as an outer layer below the biaxially oriented polymer film (a),
   wherein the barrier layer (g) comprises a metal or metal oxide layer, and wherein the sealing layer (e) comprises a heat-sealing layer.

19. A method of making a filled packaging comprising the steps of:
(i) providing the multilayer laminate according to claim 10 with a print by means of inkjet printing using water-based inks;
(ii) bringing the printed flexible film or multilayer laminate into the desired shape to form an open packaging;
(iii) filling the open packaging; and
(iv) sealing the printed flexible film or multilayer laminate by means of gluing, heat, ultrasonic and/or organic solvents to close the packaging,
wherein steps (i) to (iv) are performed inline as a part of a form fill seal process.

20. The method of claim 19, wherein the multilayer laminate comprises
(i) a not biaxially oriented polymer film (d), wherein the not biaxially oriented polymer film (d) comprises not biaxially oriented polypropylene (PP) or propylene copolymer, amorphous poly(ethylene terephthalate) (APET), not biaxially oriented glycol-modified poly(ethylene terephthalate) (PET-G), not biaxially oriented polyamide (PA), or not biaxially oriented polylactide (PLA) and/or
(ii) a heat-sealing film (e) as one outer layer, wherein the heat-sealing film (e) comprises low density polyethylene (LDPE) or linear low density polyethylene (LLDPE).

21. The inkjet printable flexible film according to claim 4, wherein the biaxially oriented polymer film (a) comprises a thermoplastic material selected from the group consisting of poly(ethylene terephthalate)s, poly(ethylene naphthalate)s, polylactides, polypropylenes, polyamides and blends and copolymers thereof.

22. The inkjet printable flexible film according to claim 1, wherein the ink-receiving layer (b) comprises less than 0.5 weight %, based on the total weight of the ink-receiving layer, of non-polymeric low molecular organic compounds having a molecular weight of less than 1,000 g/mol other than the residues of any organic dispersing agent.

23. The inkjet printable flexible film according to claim 1, wherein the ink-receiving layer (b) comprises less than 0.1 weight %, based on the total weight of the ink-receiving layer, of non-polymeric low molecular organic compounds having a molecular weight of less than 1,000 g/mol other than the residues of any organic dispersing agent.

24. The inkjet printable flexible film according to claim 7, wherein the sealing layer (e) is a heat-sealing layer.

25. The inkjet printable flexible film according to claim 1, which is translucent or opaque.

26. The inkjet printable flexible film according to claim 1, wherein the ink-receiving layer (b) is free of any cationic water-soluble polymers.

* * * * *

UNITED STATES PATENT AND TRADEMARK OFFICE
CERTIFICATE OF CORRECTION

| | | |
|---|---|---|
| PATENT NO. | : 11,400,744 B2 | Page 1 of 4 |
| APPLICATION NO. | : 16/582107 | |
| DATED | : August 2, 2022 | |
| INVENTOR(S) | : Manfred Schäfer et al. | |

It is certified that error appears in the above-identified patent and that said Letters Patent is hereby corrected as shown below:

In the Specification

Column 14, Lines 15-55, delete

"
ink-receiving layer (b)
biaxially oriented polymer film (a)
ink-receiving layer (b)
adhesion promoting layer (c)
biaxially oriented polymer film (a)
ink-receiving top layer (f)
ink-receiving layer (b)
biaxially oriented polymer film (a)
ink-receiving layer (b)
adhesion promoting layer (c)
biaxially oriented polymer film (a)
barrier layer (g): metal or metal oxide layer or metal foil
barrier layer: metal foil
printed ink-receiving layer (b)
adhesion promoting layer (c)
transparent biaxially oriented polymer film (a)
ink-receiving layer (b)
adhesion promoting layer (c)
biaxially oriented polymer film (a)
not biaxially oriented polymer film (d)
not biaxially oriented polymer film (d)
"

Signed and Sealed this
Twelfth Day of November, 2024

Katherine Kelly Vidal
*Director of the United States Patent and Trademark Office* printed ink-receiving layer (b)
adhesion promoting layer (c)
transparent biaxially oriented polymer film (a)
sealing layer (e): lacquer or film
biaxially oriented polymer film (a2)
printed ink-receiving layer (b)
adhesion promoting layer (c)
transparent biaxially oriented polymer film (a)
ink-receiving layer (b)
adhesion promoting layer (c)
biaxially oriented polymer film (a)
sealing layer (e): lacquer or film
sealing layer (e): lacquer or film
printed ink-receiving layer (b)
adhesion promoting layer (c)
transparent biaxially oriented polymer film (a)
ink-receiving layer (b)
adhesion promoting layer (c)
biaxially oriented polymer film (a)
barrier layer (g): metal or metal oxide layer or metal foil
not biaxially oriented polymer film (d)
sealing layer (e): lacquer or film
sealing layer (e): lacquer or film
not biaxially oriented polymer film (d)

barrier layer: metal foil
printed ink-receiving layer (b)
adhesion promoting layer (c)
transparent biaxially oriented polymer film (a)
————————————————————————————————" and insert

| ink-receiving layer (b) |
|---|
| biaxially oriented polymer film (a) |

| ink-receiving layer (b) |
|---|
| adhesion promoting layer (c) |
| biaxially oriented polymer film (a) |

| ink-receiving top layer (f) |
|---|
| ink-receiving layer (b) |
| biaxially oriented polymer film (a) |

--

| |
|---|
| ink-receiving layer (b) |
| adhesion promoting layer (c) |
| biaxially oriented polymer film (a) |
| barrier layer (g): metal or metal oxide layer or metal foil |

| |
|---|
| barrier layer: metal foil |
| printed ink-receiving layer (b) |
| adhesion promoting layer (c) |
| transparent biaxially oriented polymer film (a) |

| |
|---|
| ink-receiving layer (b) |
| adhesion promoting layer (c) |
| biaxially oriented polymer film (a) |
| not biaxially oriented polymer film (d) |

| |
|---|
| not biaxially oriented polymer film (d) |
| printed ink-receiving layer (b) |
| adhesion promoting layer (c) |
| transparent biaxially oriented polymer film (a) |

| |
|---|
| sealing layer (e): lacquer or film |
| biaxially oriented polymer film (a2) |
| printed ink-receiving layer (b) |
| adhesion promoting layer (c) |
| transparent biaxially oriented polymer film (a) |

| |
|---|
| ink-receiving layer (b) |
| adhesion promoting layer (c) |
| biaxially oriented polymer film (a) |
| sealing layer (e): lacquer or film |

| sealing layer (e): lacquer or film |
| --- |
| printed ink-receiving layer (b) |
| adhesion promoting layer (c) |
| transparent biaxially oriented polymer film (a) |

| ink-receiving layer (b) |
| --- |
| adhesion promoting layer (c) |
| biaxially oriented polymer film (a) |
| barrier layer (g): metal or metal oxide layer or metal foil |
| not biaxially oriented polymer film (d) |
| sealing layer (e): lacquer or film |

| sealing layer (e): lacquer or film |
| --- |
| not biaxially oriented polymer film (d) |
| barrier layer: metal foil |
| printed ink-receiving layer (b) |
| adhesion promoting layer (c) |
| transparent biaxially oriented polymer film (a) |

--